United States Patent
Murray et al.

(10) Patent No.: US 8,302,320 B2
(45) Date of Patent: *Nov. 6, 2012

(54) TOOL ASSEMBLY

(75) Inventors: Christopher J. Murray, Baltimore, MD (US); Oleksiy P. Sergyeyenko, Ottawa (CA)

(73) Assignee: Black & Decker Inc., Newark, DE (US)

(*) Notice: Subject to any disclaimer, the term of this patent is extended or adjusted under 35 U.S.C. 154(b) by 0 days.

This patent is subject to a terminal disclaimer.

(21) Appl. No.: 13/181,874

(22) Filed: Jul. 13, 2011

(65) Prior Publication Data

US 2012/0110864 A1 May 10, 2012

Related U.S. Application Data

(60) Provisional application No. 61/470,924, filed on Apr. 1, 2011.

(51) Int. Cl.
G01C 9/26 (2006.01)
(52) U.S. Cl. ............................................. 33/347; 33/379
(58) Field of Classification Search .................. 33/286, 33/379, 381, 613, 645
See application file for complete search history.

(56) References Cited

U.S. PATENT DOCUMENTS

| | | |
|---|---|---|
| 3,672,618 A | 6/1972 | Janda |
| 3,945,630 A | 3/1976 | Brunemann |
| 4,478,016 A | 10/1984 | Allen |
| 4,539,784 A | 9/1985 | Allen |
| 4,635,414 A | 1/1987 | Allen |
| 4,700,489 A | 10/1987 | Vasile |
| 5,148,108 A | 9/1992 | Dufour |
| 5,263,260 A | 11/1993 | Smith |
| 6,211,662 B1 | 4/2001 | Bijawat et al. |
| 6,330,751 B1 | 12/2001 | Seaman |
| 6,658,753 B2 | 12/2003 | Tatarnic |
| 6,691,421 B2* | 2/2004 | Roth et al. ............... 33/379 |
| 6,810,598 B2 | 11/2004 | Boys |
| 7,059,059 B1 | 6/2006 | Ames |
| 7,089,676 B2 | 8/2006 | Godinez |
| 7,690,124 B1 | 4/2010 | Henry |
| 2005/0060904 A1 | 3/2005 | Boys |
| 2005/0097765 A1 | 5/2005 | Sorensen et al. |
| 2006/0226318 A1 | 10/2006 | D'Amico |
| 2007/0011894 A1* | 1/2007 | Chen ............................ 33/286 |
| 2010/0115781 A1* | 5/2010 | Norelli ......................... 33/451 |
| 2012/0068852 A1 | 3/2012 | Sergyeyenko et al. |

FOREIGN PATENT DOCUMENTS

| | | |
|---|---|---|
| DE | 2063 365 A1 | 7/1972 |
| DE | 202 07 979 | 10/2002 |
| WO | WO-9112492 A1 | 8/1991 |

* cited by examiner

*Primary Examiner* — G. Bradley Bennett
(74) *Attorney, Agent, or Firm* — Harness, Dickey & Pierce, P.L.C.

(57) ABSTRACT

A tool assembly that includes a tool, which has a frame and a pair of suction cups. Each suction cup has a cup housing and a cup structure. The cup housing is coupled to the frame. The cup structure is at least partly received in the cup housing. At least one of the cup structures is rotatable relative to the frame. A method for releasably securing a tool assembly to a wall is also provided.

19 Claims, 12 Drawing Sheets

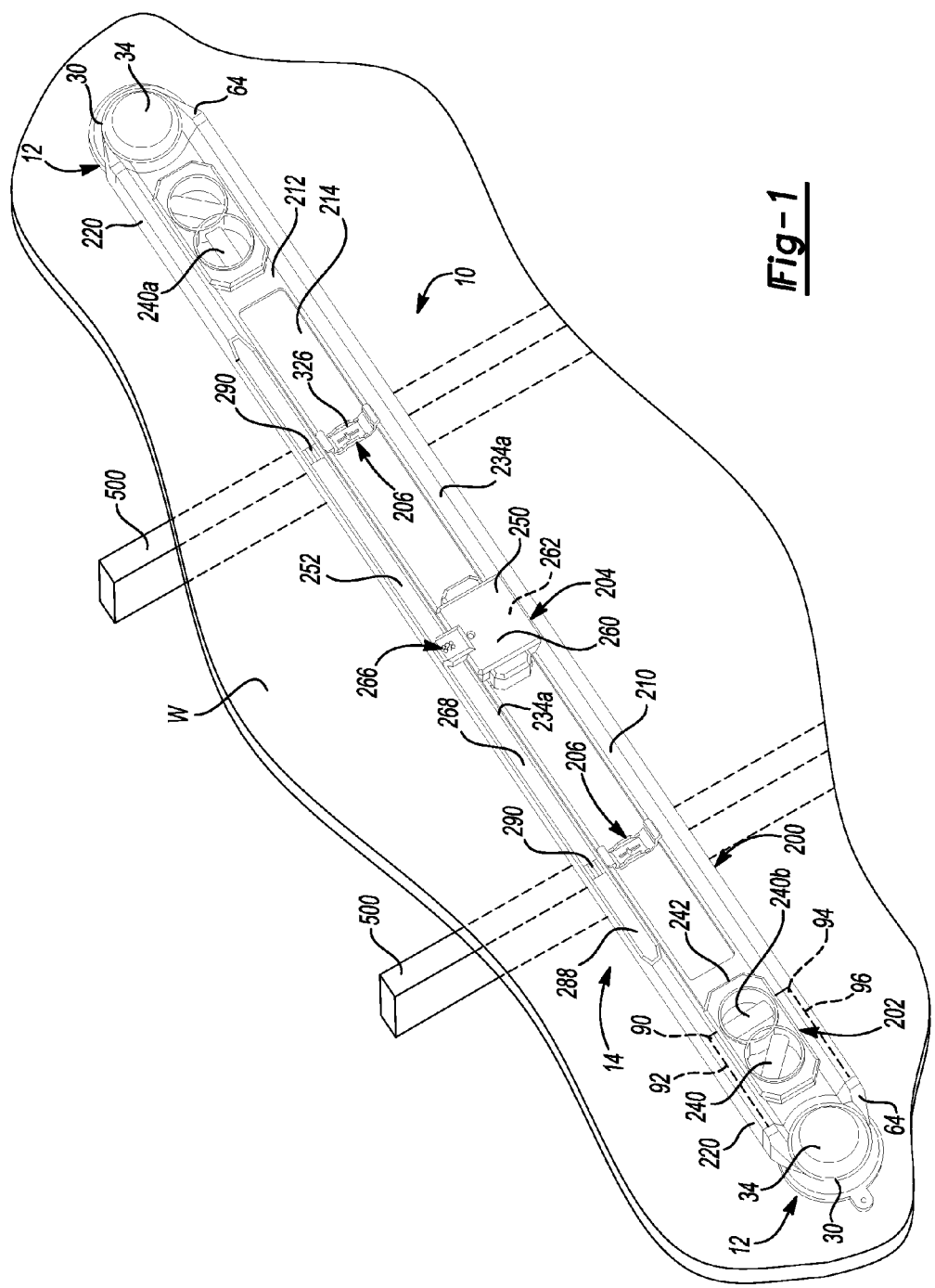

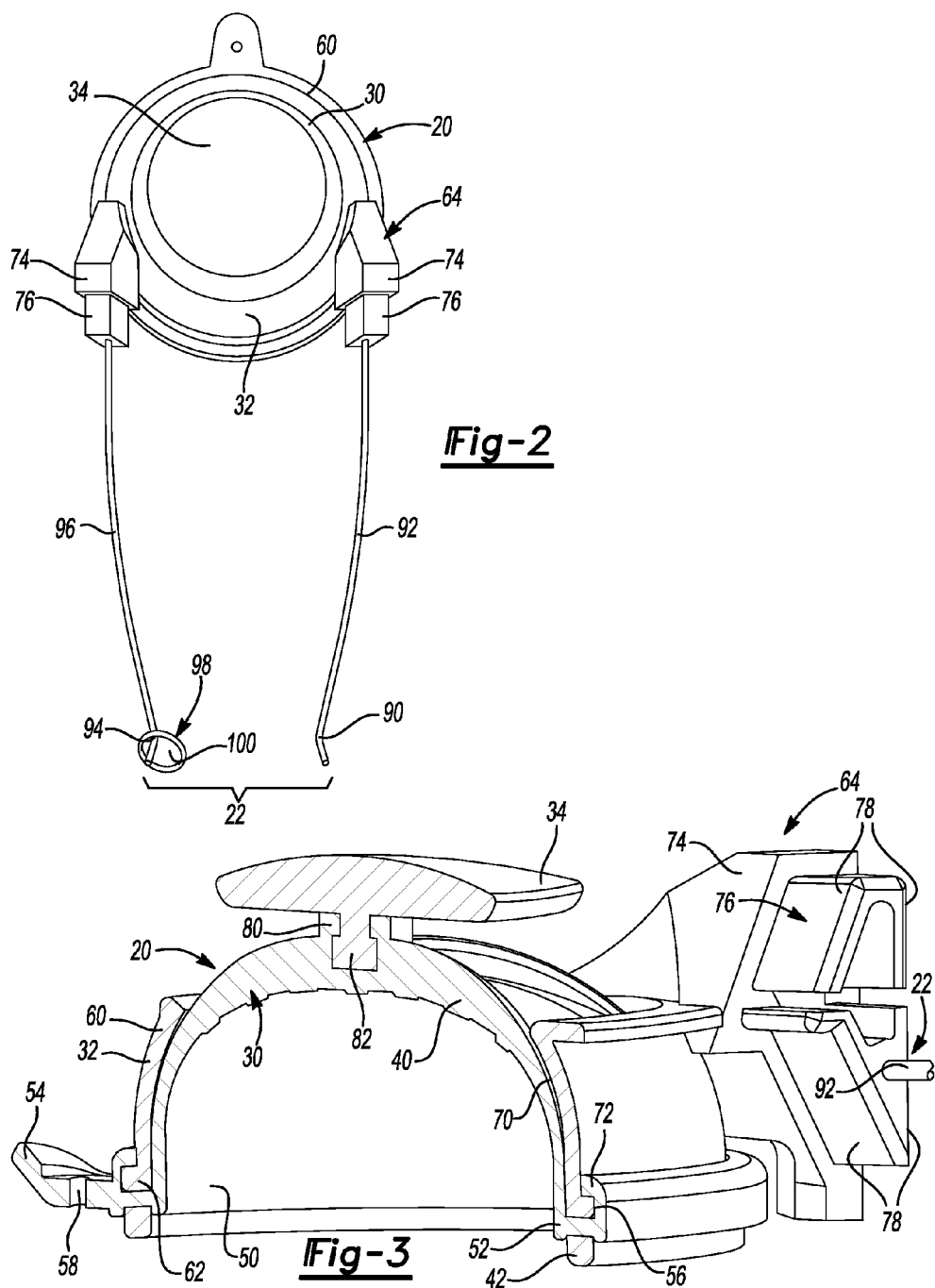

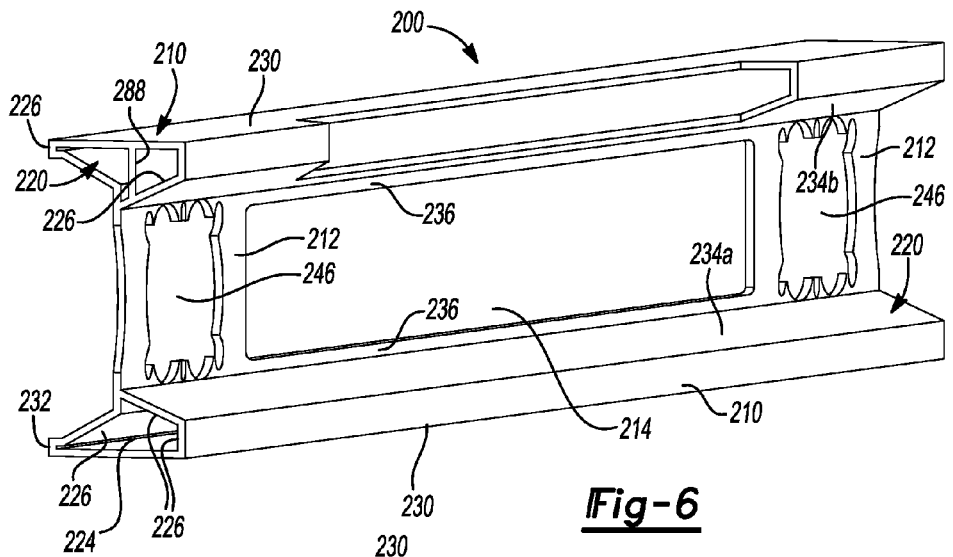
Fig-6
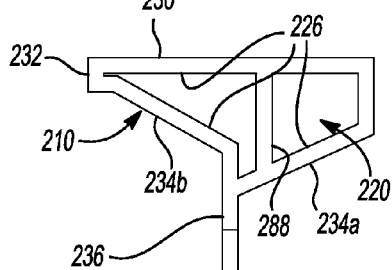
Fig-7
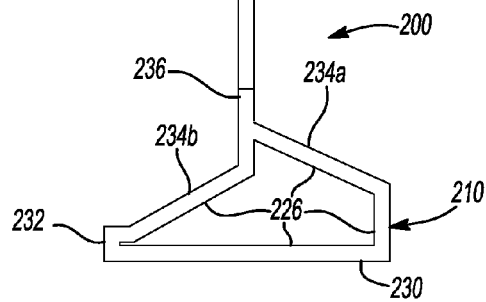

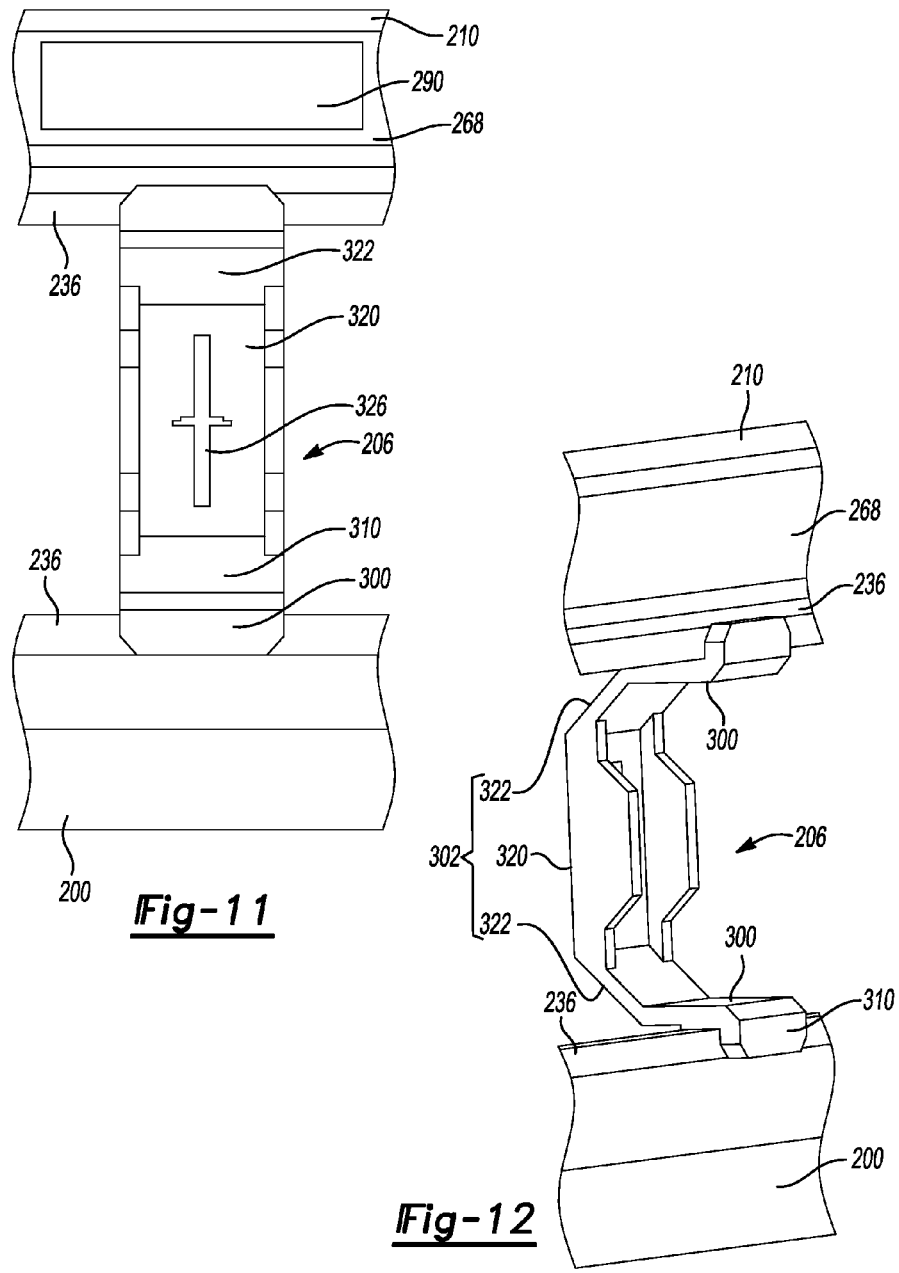

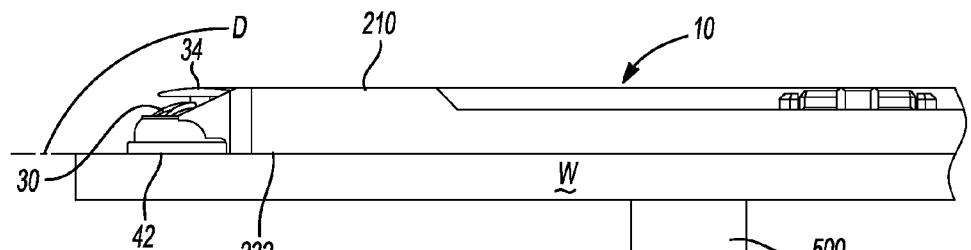
Fig-13
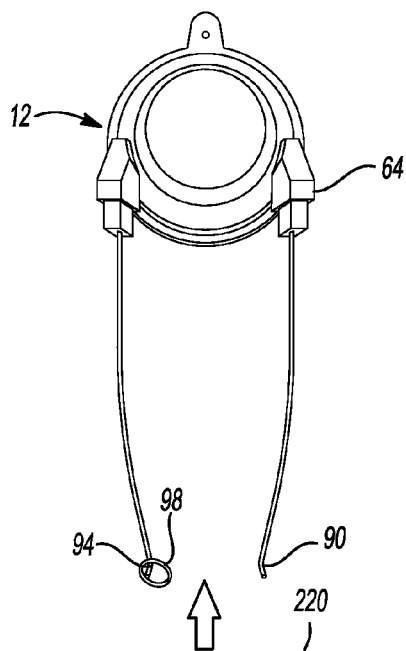
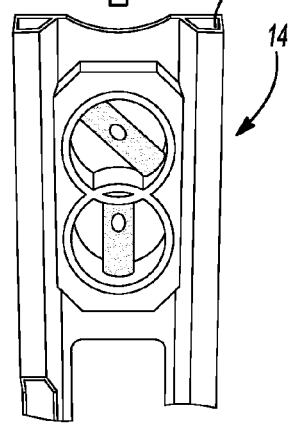
Fig-14

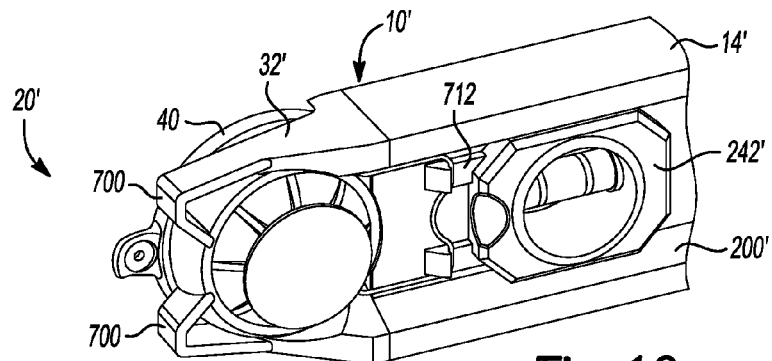
*Fig-19*
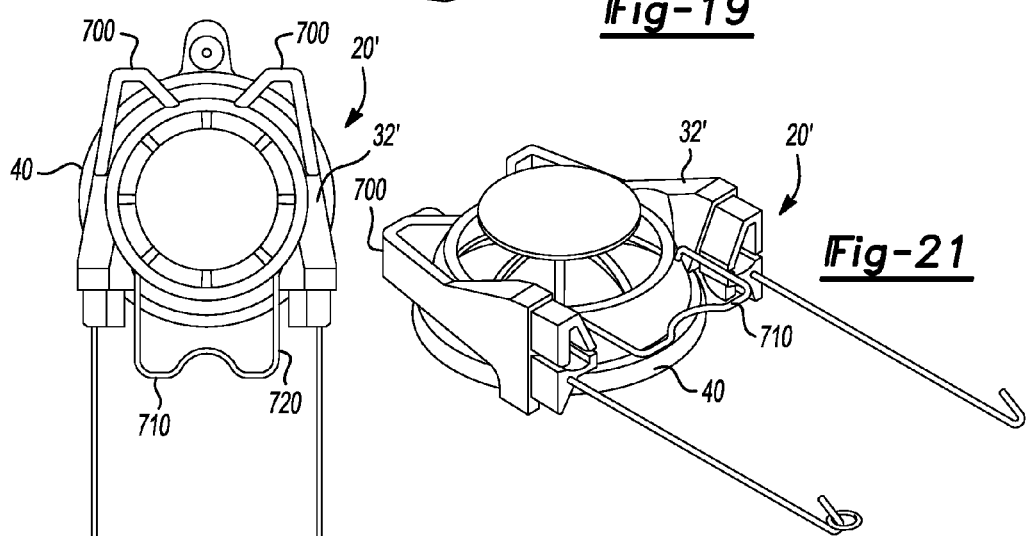
*Fig-20*
*Fig-21*
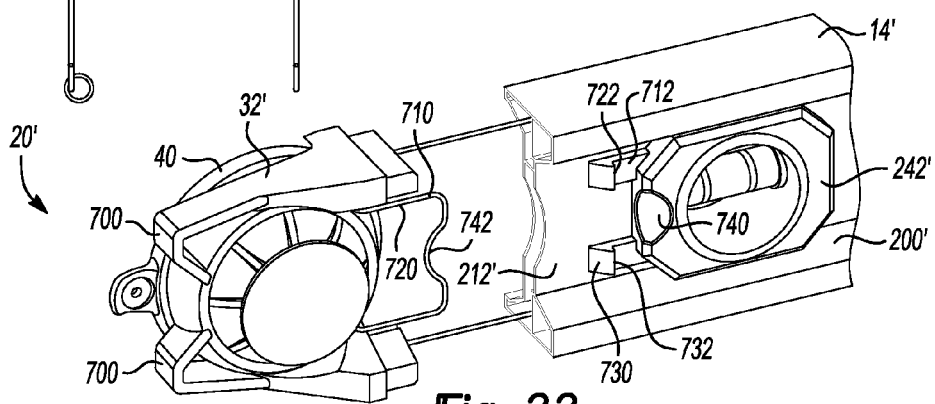
*Fig-22*

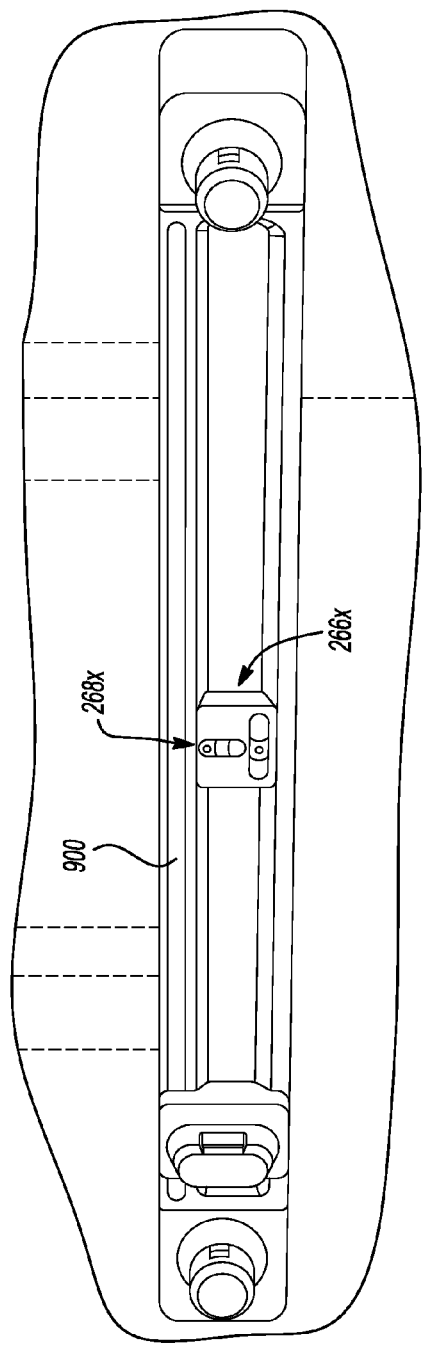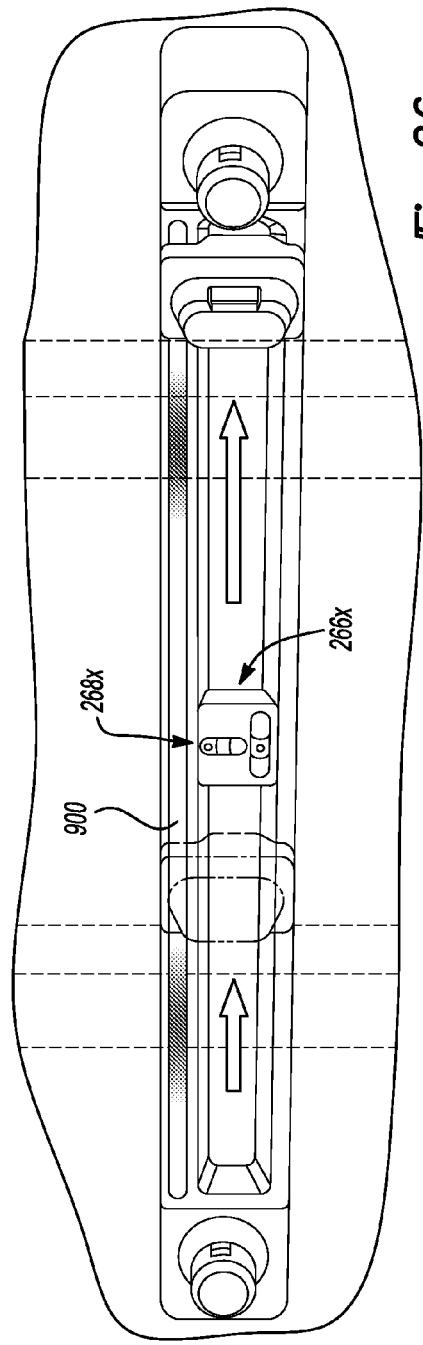

TOOL ASSEMBLY

CROSS-REFERENCE TO RELATED APPLICATIONS

This application claims the benefit of U.S. Provisional Patent Application No. 61/470,924 filed Apr. 1, 2011, the disclosure of which is hereby incorporated by reference as if fully set forth in detail herein.

INTRODUCTION

The present invention generally relates to a tool assembly and a method for its use. In one form, the tool assembly can comprise a tool and a pair of suction cups that are configured to releasably couple the tool to a work surface. In another form, the tool assembly that is configured to display the location of a hidden object detected by a hidden object detector. In still another form, the tool assembly includes a device that can be employed to temporarily mount an article to a wall at a desired mounting position and to indicate a position at which a hanger is to be installed so that when the article is mounted to the hanger the article will be located at the desired mounting position.

Various tool assemblies employ a tool and a suction means that is coupled to the tool. For example, U.S. Pat. No. 5,479,717 to von Wedemeyer discloses a level having We have found that some users can have difficulties using such levels, particularly when the level has a length that is greater than about three-quarters of a meter in length. Additionally or alternatively, we believe that some users would appreciate additional functionality incorporated into a level or other tool assembly. Accordingly, there remains a need in the art for an improved tool assembly, such as an improved level.

SUMMARY

This section provides a general summary of some aspects of the present disclosure and is not a comprehensive listing or detailing of either the full scope of the disclosure or all of the features described therein.

In one form, the present teachings provide a tool assembly that includes a tool, which has a frame, and a pair of suction cups. Each suction cup has a cup housing, and a cup structure. The cup housing is coupled to the frame. The cup structure is at least partly received in the cup housing. At least one of the cup structures is rotatable relative to the frame.

In another form, the present teachings provide a method for releasably securing a tool assembly to a wall. The tool assembly includes a level sensor and a first suction cup. The method includes: abutting the tool assembly to the wall; purging air from the first suction cup to create a pressure differential that secures the first suction cup to the wall; and rotating the level sensor about the first suction cup.

In still another form, the present teachings provide a tool assembly includes a pair of suction cups and a tool. Each suction cup has a cup housing, and a cup member. The cup housing includes a cup mount. The cup member is at least partly received in the cup housing and is rotatable relative to the cup housing. The tool has a mating cup mount that removably receives the cup mount to thereby couple the suction cup to the tool.

In a further form, the present teachings provide a tool assembly that includes a rail, a hidden object detector, which is slidably coupled to the rail, and a display unit having a display member and a marking unit. The marking unit is configured to be activated to form a mark on the display member in response to detection of a hidden object by the hidden object detector.

In another form, the present teachings provide a tool assembly that includes a pair of rails, which cooperate to form a set of ways, a hidden object detector, which is slidably mounted on the ways, a display member, which is mounted to a first one of the rails, and a marking unit that is coupled to the hidden object detector and disposed in-line with the display member. The marking unit is activated in response to detection of a hidden object by the hidden object detector to generate electromagnetic radiation that impinges on the display member to thereby form a mark on the display member.

In yet another form, the present teachings provide a tool assembly having a frame, a level sensor mounted to the frame, a pair of suction cups coupled to the frame, a display member, a hidden object detector that is slidably disposed on the frame, and a marking unit. The frame has a pair of rails that define a set of ways and a first one of the rails has an internal wall that is partly exposed. The hidden object detector slidably mounted on the ways. The display member mounted to the exposed portion of the internal wall. The marking unit is coupled to the hidden object detector and is disposed in-line with the display member. The marking unit is activate-able to form a mark on the display member.

In still another form, the present teachings provide a tool assembly having a suction cup that is configured to be removably coupled to a vertical wall and a device for temporarily mounting an article to the suction cup at a desired mounting position and for indicating a position of a hanger on the vertical wall. The hanger is configured to be secured to the vertical wall to mount the article to the vertical wall.

In a further form, the present teachings provide a tool assembly having a suction cup, a first link member, a first hook, and a tool. The suction cup includes a cup housing, and a cup member. The cup housing has a cup mount. The cup member is at least partly received in the cup housing. The first link member is coupled to the cup housing. The first hook is coupled to the first link member on a side opposite the cup housing. The tool has a mating cup mount and a first hollow channel. The mating cup mount is removably received by the cup mount to couple the suction cup to the tool. The first link member and the first hook are received in the first hollow channel when the cup mount is received in the mating cup mount.

Further areas of applicability will become apparent from the description provided herein. It should be understood that the description and specific examples in this summary are intended for purposes of illustration only and are not intended to limit the scope of the present disclosure, its application and/or uses in any way.

BRIEF DESCRIPTION OF THE DRAWINGS

The drawings described herein are for illustrative purposes only and are not intended to limit the scope of the present disclosure in any way. The drawings are illustrative of selected teachings of the present disclosure and do not illustrate all possible implementations. Similar or identical elements are given consistent identifying numerals throughout the various figures.

FIG. 1 is a perspective view of an exemplary tool assembly constructed in accordance with the teachings of the present disclosure, the tool assembly being releasably coupled to a wall;

FIG. 2 is a perspective view of a portion of the tool assembly of FIG. 1 illustrating a suction cup in more detail;

FIG. 3 is a perspective, partially sectioned view of the suction cup shown in FIG. 2;

FIG. 6 is a perspective view of a portion of the tool assembly of FIG. 1 that illustrates a frame of a tool;

FIG. 7 is a left side elevation view of the frame of FIG. 6;

FIG. 11 is a front elevation view of the tool assembly of FIG. 1 illustrating a hidden object marker and a portion of a display member of the detection and display unit;

FIG. 12 is a perspective view of the tool assembly of FIG. 1 illustrating a hidden object marker a the portion of the display member of the detection and display unit;

FIG. 13 is a top plan view of a portion of the tool assembly of FIG. 1 as temporarily mounted to a wall;

FIG. 14 is an exploded perspective view of a portion of the tool assembly of FIG. 1 illustrating the removal of the suction cup from the tool;

FIG. 19 is a perspective view of a portion of another tool assembly constructed in accordance with the teachings of the present disclosure;

FIG. 20 is a front elevation view of a portion of the tool assembly of FIG. 19, illustrating a base in more detail;

FIG. 21 is a perspective view of the base shown in FIG. 20;

FIG. 22 is a partially exploded perspective view of the tool assembly of FIG. 21 illustrating the base partially removed from the frame;

FIGS. 25 and 26 are perspective views depicting another tool assembly constructed in accordance with the teachings of the present disclosure, the tool assembly being illustrated in operative association with a wall and employing a lighted display for identifying a location of a hidden object.

Corresponding reference numerals indicate corresponding parts throughout the several views of the drawings.

DETAILED DESCRIPTION OF THE VARIOUS EMBODIMENTS

Figure 4:
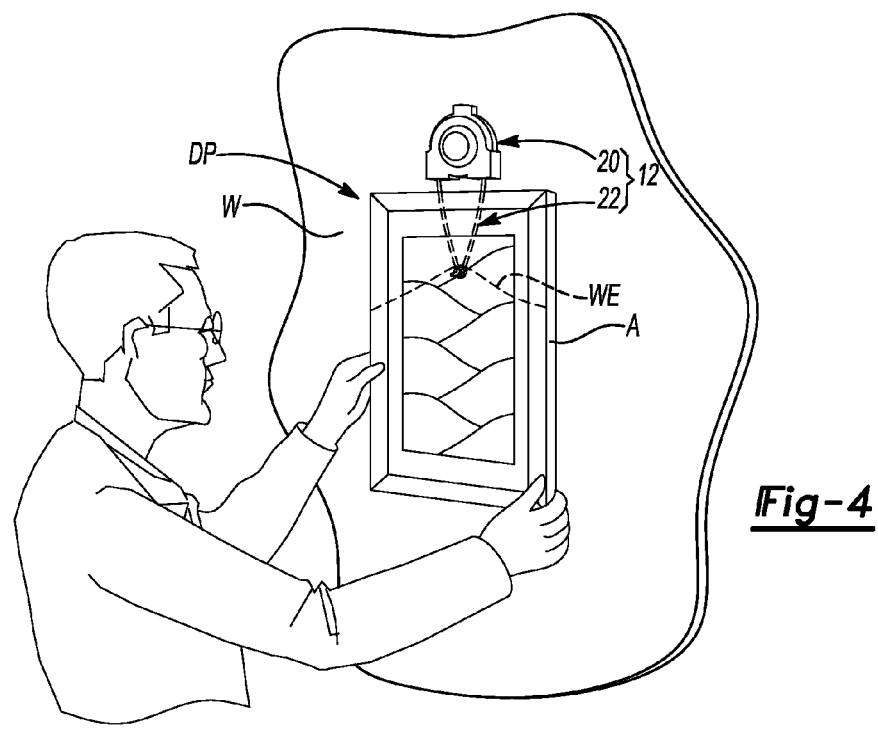
FIG. 4 is a perspective view of the suction cup of FIG. 2 as used to temporarily secure an article to a wall.

With reference to FIG. 1 of the drawings, a tool assembly constructed in accordance with the teachings of the present disclosure is generally indicated by reference numeral 10. The tool assembly 10 can include one or more bases 12 and a tool 14. In the particular example provided, the tool 14 comprises a level and a stud finder, but it will be appreciated that the teachings of the present disclosure have broader application to various other types of tools, and moreover that the tool 14 may be omitted in some situations.

With reference to FIGS. 2 and 4, each base 12 can comprise a suction cup 20 and a means 22 for temporarily mounting an article A to the suction cup 20 at a desired mounting position DP and for indicating a position IP (FIG. 5) of a hanger 600 (FIG. 16) on a vertical wall W where the hanger 600 (FIG. 16) is configured to secure the article A to the wall W at the desired mounting position DP.

With reference to FIG. 3, the suction cup 20 can comprise a cup structure 30, a housing 32 and a plunger 34. The cup structure 30 can comprise a cup member 40 and a seal member 42 that can be fixedly coupled to the cup member 40. The cup member 40 and the seal member 42 can be integrally formed of a resilient elastomeric material. Alternatively, the cup member 40 and the seal member 42 can be formed of different materials. For example, the cup member 40 can be formed of silicone rubber and can have a durometer that can exceed 20 Shore A, while the seal member 42 can be formed of silicone rubber or foam and can have a durometer that is less than or equal to 15 Shore A and preferably less than or equal to 10 shore A. The cup member 40 can comprise a cup 50, a seal flange 52 and a release tab 54. The seal flange 52 can extend about the perimeter of the cup 50 and can define an annular chamber 56 having a generally U-shaped cross-section. The release tab 54 can extend radially outwardly from the seal flange 52 and can have a mounting aperture 58 formed therein. The mounting aperture 58 in the release tab 54 can be configured to receive a push-pin (not shown) therethrough (e.g., to permit the suction cup 20 to be suspended from a wall W or other work surface via a push-pin (not specifically shown) in situations where the seal member 42 cannot be sealingly engaged to the work surface).

The seal member 42 can be overmolded onto the seal flange 52 so as to be cohesively bonded to the cup member 40. Alternatively, the seal member 42 can be a discretely formed seal structure, such as an O-ring, that can be fixedly coupled to the seal flange 52 in a desired manner (e.g., snap fit and/or an adhesive).

With reference to FIGS. 2 and 3, the housing 32 can include an annular body 60, which can be configured to shroud a portion of the cup structure 30, an annular coupling flange 62, and a cup mount 64. The body 60 can define a bore 70 into which the cup structure 30 can be received. The annular coupling flange 62 can be matingly received into the annular chamber 56 in the seal flange 52 and a distal arm 72 of the seal flange 52 may wrap around an opposite side of the annular coupling flange 62 to secure the housing 32 to the cup structure 30. In the particular example provided, the seal flange 52 is configured to resiliently engage the annular coupling flange 62 in a manner that permits rotation of the housing 32 relative to the cup structure 30, but it will be appreciated that any other suitable means may be employed to retain the housing 32 to the cup structure 30, including adhesives and overmolding (of the cup structure 30 onto the housing 32). The cup mount 64 can be coupled to the body 60 and can be configured to engage the tool 14 to permit the base 12 to be fixedly but removably coupled to the tool 14. In the particular example provided, the cup mount 64 comprises a pair of spaced apart arms 74 having an insertion portion 76 with a plurality of insertion wall members 78 that will be described in more detail below.

The plunger 34 may be coupled to the cup structure 30 or the housing 32 and can be employed to deform the cup structure 30 to expel air from the interior of the cup structure 30 to cause the seal member 42 to sealingly engage a work surface. In the particular example provided, the plunger 34 is fixedly coupled to the cup structure 30 via a boss 80 on the cup structure 30 that matingly engages a stem 82 of the plunger 34.

With renewed reference to FIGS. 2 and 4, the temporary mounting and indicating means 22 can comprise a device that may be removably coupled to the article A, such as at least one hook, and which can also be coupled to the housing 32. In the particular example provided, the means 22 comprises a first generally U-shaped hook 90, which is coupled to the housing 32 via a first link member 92, and a second generally U-shaped hook 94, which is coupled to the housing 32 via a second link member 96. In the example illustrated, the first and second hooks 90 and 94 are configured to engage a wire element WE that is fixedly coupled to the rear of the article A, but it will be appreciated that the first and second hooks 90 and 94 could be configured to engage various types of commercially available hardware, such as one or more D-ring wire strap picture hangers, cup hooks, shoulder hooks, S-hooks, eye screws, ring hangers, and/or sawtooth picture hangers for example.

The first link member 92 can be unitarily formed with the first hook 90 from a relatively stiff first wire that can be fixedly coupled to and extend axially from a first one of the arms 74, while the second link member 96 can be unitarily formed with the second hook 94 from a relatively stiff second wire that can be fixedly coupled to and extend axially from a second one of the arms 74.

Figure 5:
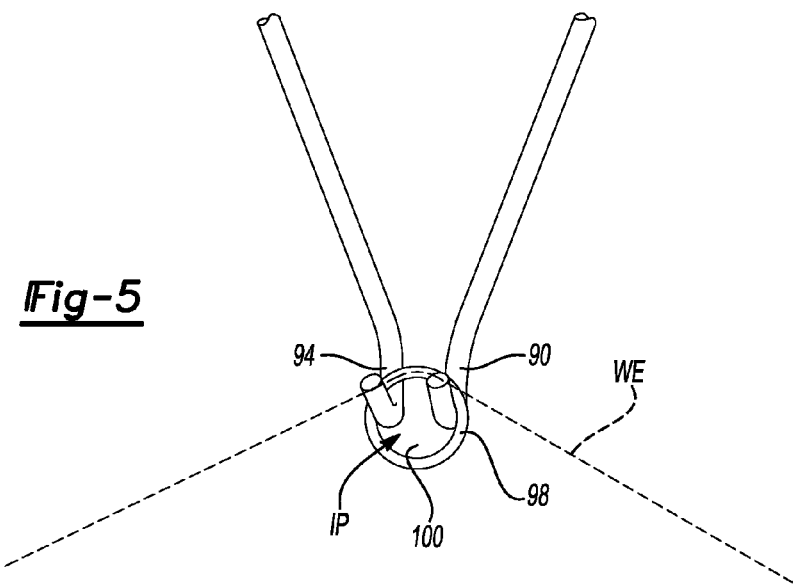
FIG. 5 is a perspective view of a portion of the suction cup of FIG. 2 illustrating a temporary mounting and indicating means in more detail.
Figure 8:
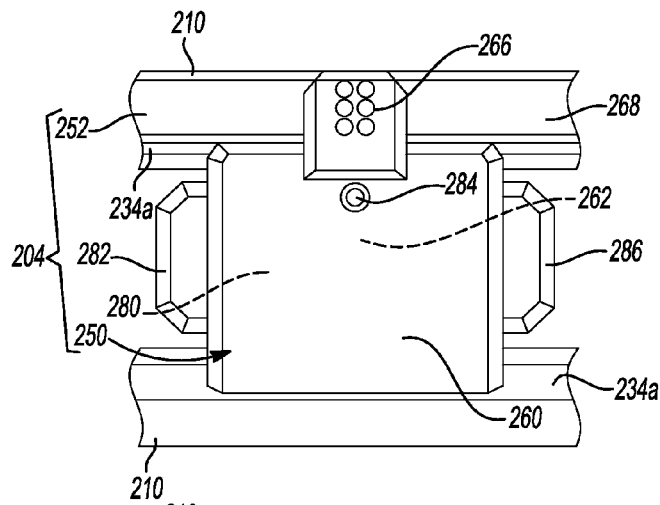
FIG. 8 is front elevation view of a portion of the tool assembly of FIG. 1 illustrating a detection and display unit in more detail.
Figure 9:
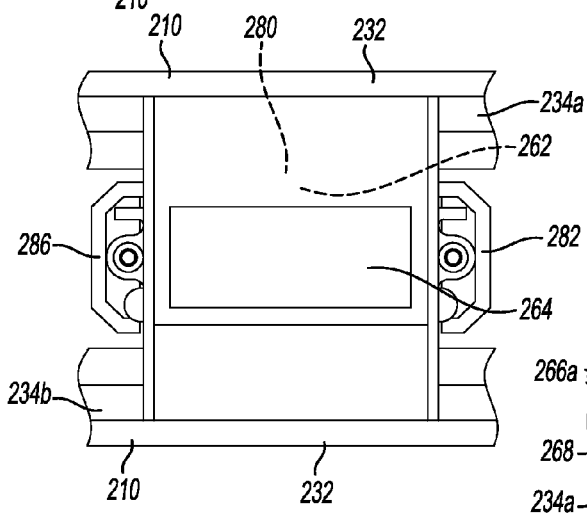
FIG. 9 is a rear elevation view of a portion of the tool assembly of FIG. 1 illustrating the detection and display unit in more detail.
Figure 10:
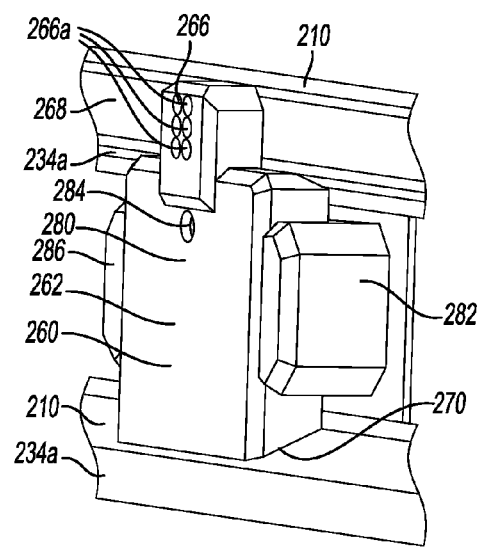
FIG. 10 is a perspective view of a portion of the tool assembly of FIG. 1 illustrating the detection and display unit in more detail.
Figures 15, 16:
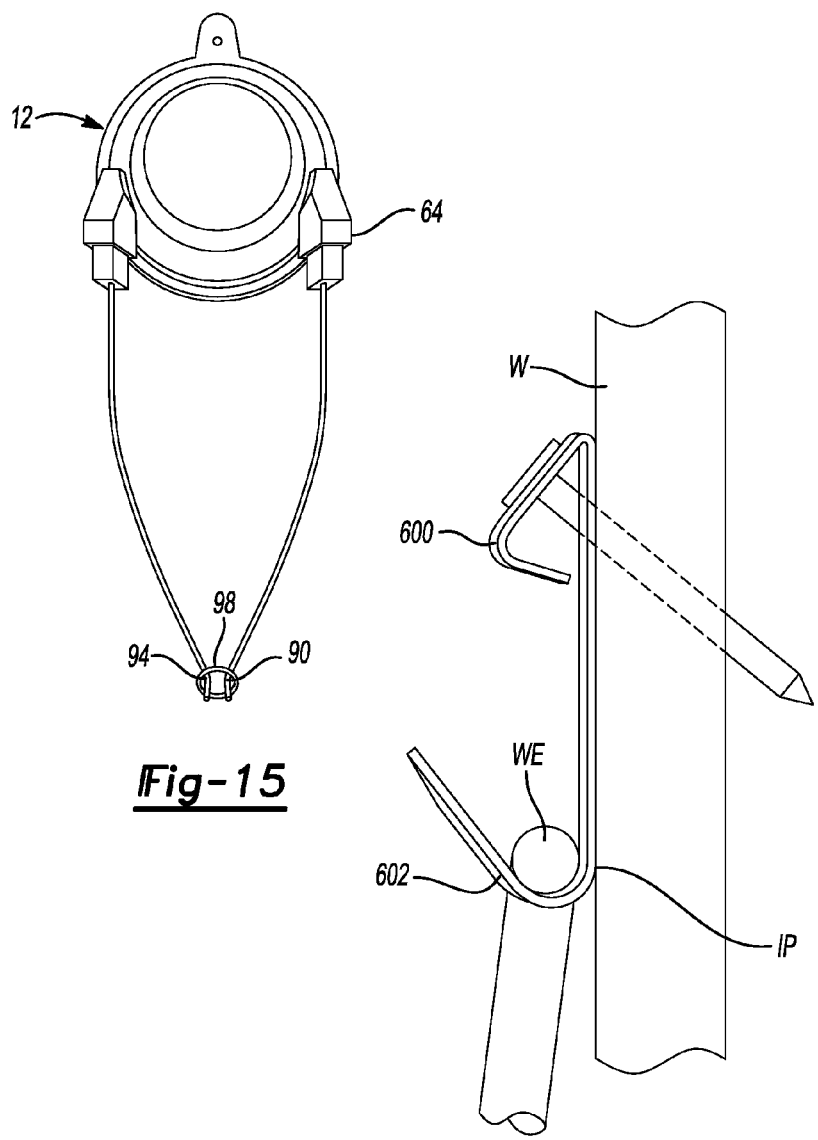
FIG. 15 is a perspective view of the suction cup in which first and second hooks of the temporary mounting and indicating means are coupled to one another.
FIG. 16 is a side elevation view of a common commercially available picture hanger mounted to a wall according to the methodology of the present disclosure.

As also described above, the means 22 can additionally or alternatively provide the function of indicating a position at which the hanger 600 (FIG. 16) is to be mounted on the wall W so that the article A may be suspended on the wall by the hanger 600 (FIG. 16) at the desired mounting position DP. In some situations, the means 22 may comprise no other structure than that which is employed to temporarily mount the article A to the wall W. For example, one or both of the first and second hooks 90 and 94 may be employed to indicate or approximate the position of the hanger 600 (FIG. 16) on the wall W. In the particular example provided, however, the means 22 further comprises an indicating structure 98 that is configured to indicate the position of the hanger 600 (FIG. 16) on the wall W. The indicating structure 98 can define an aperture 100 through which the user may mark the wall W at the position of the hanger 600 (FIG. 16). In the illustrated example, the indicating structure 98 is a ring that is fixedly coupled to the second hook 94; the ring is configured to be positioned about the first hook 90 as shown in FIG. 5 so that the first and second hooks 90 and 94 are disposed proximate one another and is also configured such that its center is approximately aligned to the bottom of the hook 602 (FIG. 16) on the hanger 600 (FIG. 16). It will be appreciated, however, that the indicating structure 98 could be configured to indicate the position of the hanger 600 (FIG. 16) in other ways, including identification of a location of a fastener, such as a pin, a nail or a screw, that is employed to secure the hanger 600 (FIG. 16) to the wall W.

While the means 22 has been illustrated and described in a particular manner, it will be appreciated that the means 22 may employ a single hook, that the hook(s) may have a shape that is different from that which is depicted in the drawings, that one or more of the hooks may be directly coupled to the housing 32 (i.e., without a corresponding link member), that one of the hooks can be configured to engage the other hook or its link member in addition to or in lieu of engagement with the article A and/or that one or both of the hooks can be removably coupled to their link member or from the housing 32. With specific regard to a hook that is removable from it's link member, it will be appreciated that the hanger 600 (FIG. 16) can serve as the hook that is attached to one or more of the link members, and/or can be the indicating structure 98 that is employed to indicate the position of the hanger 600 (FIG. 16) (i.e., its position) on the wall W.

Returning to FIG. 1, the tool 14 can include a frame 200, one or more level sensor units 202, a detection and display unit 204, and one or more hidden object markers 206. The frame 200 can be formed of any desired material, but in the particular example provided, is an aluminum extrusion. With additional reference to FIGS. 6 and 7, the frame 200 can define a pair of rails 210, one or more level mount structures 212, and a central cavity 214 disposed between the rails 210 and the level mount structures 212.

The rails 210 can be generally hollow and can form a mating cup mount 220 that is configured to receive and retain the cup mount 64 such that the first link member 92 and the first hook 90 are stored in one of the hollow rails 210, while the second link member 96 and the second hook 94 are stored in the other one of the hollow rails 210. In the particular example provided, the rails 210 define a receiving portion 224 having a plurality of receiving wall members 226 that are configured to frictionally engage the insertion wall members 78 (FIG. 3) of the arms 74 (FIG. 3) of the cup mount 64. It will be appreciated however that various other means, including latches, locks and detents, may be employed in addition to or in lieu of frictional engagement to release ably couple the cup mount 64 and the mating cup mount 220 to one another. Moreover, while the cup mount 64 has been described as frictionally engaging an interior surface formed on the mating cup mount 220, it will be appreciated that the cup mount 64 could be configured to engage an exterior surface formed on the mating cup mount 220 in the alternative.

Each of the rails 210 can include a leveling side wall 230, an abutting surface 232 and a pair of tapered or angled guide surfaces 234a, 234b that are disposed on opposite sides of a central rib 236. The leveling side wall 230 can be fully or partially flat (i.e., with a V-shaped groove that is conventionally configured to permit the leveling side wall 230 to rest on a curved surface, such as the exterior surface of a tube) and can be perpendicular to the abutting surface 232. The abutting surfaces 232 can cooperate to define a datum plane D (FIG. 13).

The level sensor units 202 can comprise any conventional (level sensing) means for determining a predetermined orientation (e.g., level state), such as one or more conventional fluid-carrying bubble vials 240, and a level housing 242 into which the level sensing means can be mounted. While the level sensing means depicted in the drawings comprises one or more fluid-carrying bubble vials 240, it will be appreciated that other means, including electronic circuits, can be employed in addition to or in lieu of the fluid-carrying bubble vials 240. It will be appreciated that each of the fluid-carrying bubble vials 240 can be configured to indicate the orientation of the leveling side walls 230 relative to a predetermined orientation. For example, the fluid-carrying bubble vial 240a can indicate the orientation of the leveling side walls 230 relative to a horizontal orientation (i.e., indicating levelness), while the fluid-carrying bubble vial 240b can indicate the orientation of the leveling side walls 230 relative to a vertical orientation (i.e., indicating plumbness). Each level housing 242 can be received into an associated aperture 246 (FIG. 6) defined by an associated level mount structure 212.

With reference to FIGS. 1 and 8-10, the detection and display unit 204 can comprise a detector unit 250 and a display 252. The detector unit 250 can comprise a unit housing 260, a conventional hidden object detector 262, and a low-friction abutment member 264, while the display 252 can comprise a marking unit 266 and a display member 268.

The unit housing 260 can be configured to house the hidden object detector 262 and the marking unit 266 and can be slidably mounted on the rails 210 of the frame 200 for movement across the central cavity 214. In the particular example provided, each pair of guide surfaces 234a, 234b on the rails 210 cooperate to form a set of ways that are matingly engaged by corresponding tapered or angled guide surfaces 270 (only one of which is specifically shown in FIG. 10) on the unit housing 260. It will be appreciated that the guide surfaces 234a, 234b on the rails 210 and the guide surfaces 270 on the unit housing 260 cooperate to constrain movement of the unit housing 260 so that it may be repeat-ably and accurately translated parallel to or within the datum plane D (FIG. 13) that is defined by the abutting surfaces 232 of the rails 210.

It will be appreciated that the datum plane D (FIG. 13) can be coincident with or slightly offset from (but parallel to) the surface of a wall W (FIG. 13) against which the abutting surfaces 232 of the rails 210 are abutted. The low-friction abutment member 264, which can be coupled to the unit housing 260 and formed of any suitable material having a relatively low coefficient of friction (as compared to the unit housing 260), can be employed to reduce friction between the unit housing 260 and the wall W to reduce the force needed to translate the unit housing 260 along the rails 210 when the abutting surfaces 232 are abutted against the wall W.

The hidden object detector 262 can include any type of means for detecting an object, such as a stud, hidden behind a wall. In the particular example provided, the hidden object detector 262 comprises conventional a hidden object sensor circuit 280 that can be similar to those which are described in U.S. Pat. Nos. 4,099,118 and/or 4,464,622, the disclosures of which are hereby incorporated by reference as if fully set forth in detail herein. A detailed discussion of the construction and operation of the hidden object sensor circuit 280 need not be provided herein, but it will be appreciated that the hidden object sensor circuit 280 can conventionally include an on/off switch 282, light sources, such as one or more LED's 284 for indicating power operation, calibration, and/or the detection of an object, and/or a mode or reset switch 286.

The marking unit 266 can be any type of device that is configured to form a mark on the display member 268. The marking unit 266 can form in mark in any desired manner, and can employ electronic signals, magnetism physical contact, heat, or a form of electromagnetic radiation, such as a form of light, for example. In the particular embodiment illustrated, the marking unit 266 is configured to generate and direct UV light toward, and optionally focus the UV light on, the display member 268. In the particular example provided, the marking unit 266 comprises a plurality of UV light generating LED's 266a that are mounted in the unit housing 260 at a location in-line with one of the rails 210. The marking unit 266 can be electrically coupled to the hidden object sensor circuit 280 and can be operated to generate UV light in response to detection of an object by the hidden object sensor circuit 280. In the illustrated example the hidden object sensor circuit 280 is configured to provide an output signal that is employed to directly power the marking unit 266. It will be appreciated, however, that alternatively the hidden object sensor circuit 280 could output a signal that can be employed to actuate a power supply that is employed to provide electrical power for generation of UV light by the marking unit 266.

The display member 268 can be formed of a UV light sensitive material. The display member 268 can be mounted to the one of the rails 210, e.g., via an adhesive, so as to be situated between the frame 200 and the marking unit 266. For example, a portion of one of the rails 210 may be removed, as by machining, to expose a flat internal wall member 288 (FIG. 7) to which the display member 268 may be fixedly coupled. It will be appreciated, however, that the display member 268 could be mounted to an exterior surface of the frame 200, such as to an exterior surface of one of the rails 210.

In the example provided, UV light emitted by the marking unit 266 can cause the UV sensitive strip 268 to change color and/or glow or luminesce in the area where the UV light emitted by the marking unit 266 impinges upon the display member 268 ("the UV light effected zone 290" which is depicted in FIG. 11). In situations where the display member 268 is configured to change color in response to exposure to UV light, it will be appreciated that the color change of the UV light effected zone 290 (FIG. 11) may be permanent. Preferably, the color change and/or luminescence of the UV light effected zone 290 (FIG. 11) on the display member 268 is configured to span a predetermined time segment after the marking unit 266 has been toggled off, such as a time segment that is less than or equal to 10 minutes, preferably between 15 seconds and 5 minutes, and more preferably between 45 seconds and 2 minutes. After elapse of the time segment the exposed or UV effected zone 290 (FIG. 11) (i.e., the color-changed and/or luminescing part of the of the display member 268) reverts substantially completely to the color and/or non-luminescing state of the display member 268 in its unexposed or unaffected state.

With reference to FIGS. 1, 11 and 12, the hidden object markers 206 can comprise a pair of rail mounts 300 and a marking portion 302. The rail mounts 300 can be disposed on opposite sides of the marking portion 302 and can be configured to slidably couple the hidden object markers 206 to the rails 210. In the example provided, each rail mount 300 comprises a pair of tabs 310 that are engaged to (i.e., on opposite sides of) a corresponding one of the central ribs 236. The marking portion 302 can be disposed in the central cavity 214 and can include a central portion 320, which can abut the datum plane D (FIG. 13), and end portions 322 that taper between a respective one of the rail mounts 300 and the central portion 320. The central portion 320 can comprise one or more marking holes 326 that are configured to permit a user of the tool 14 to use a pen or pencil to transfer the location of the marking holes 326 onto the wall W. The marking holes 326 can have any desired shape or shapes, but in the example provided, are shaped similar to a plus symbol (+) having an elongated center segment.

With reference to FIG. 1, the tool assembly 10 may be employed, for example, to secure a structure, such as shelf brackets (not shown), to studs 500 behind the wall W. The tool assembly 10 may be brought into contact with the wall W (i.e., such that the abutting surfaces 232 of the rails 210 abut the wall W) and positioned such that the central cavity 214 is disposed approximately at the height at which the structure is to be secured to the studs 500. The fluid-carrying level sensor unit vial 240a may be employed to align the leveling side walls 230 in a horizontal or level orientation that spans across the studs 500. The plungers 34 of the suction cups 20 may be depressed to purge air from the cup structures 30 to permit the seal members 42 to sealingly engage the wall W. It will be appreciated that once the tool assembly 10 has been secured to the wall W by the suction cups 20, the user may release the tool assembly 10 with both hands.

The user may activate (e.g., toggle on and calibrate) the hidden object detector 262 and then sweep the hidden object detector 262 across the central cavity 214. It will be appreciated that the ways (i.e., the sets of guide surfaces 234a and 234b (FIG. 7) and the unit housing 260 cooperate to maintain the hidden object detector 262 in a predetermined orientation relative to the datum plane D as the hidden object detector 262 is swept along the central cavity 214. When an object, such as the stud 500, is detected by the hidden object sensor circuit 280 the marking unit 266 can be responsively operated to generate UV light that impinges on the display member 268 to create color-changed and/or luminescing zones (i.e., UV light effected zones 290) that are indicative of the position of the studs 500.

The user may locate the unit housing 260 approximately centrally between the UV light effected zones 290 and may slide each of the hidden object markers 206 along the rails 210 such that they are centered or otherwise aligned with a corresponding one of the UV light effected zones 290. Thereafter the user may use a marking tool, such as a pencil (not shown), in the marking holes 326 to transfer the location of the studs 500 from the tool assembly 10 to the wall W.

While the display 252 has been described as employing a display member 268 that is coupled to the frame 200 of the tool 14, it will be appreciated that the display member 268 may comprise a discrete component that may be secured to the wall W independently of the frame 200. For example, the display member 268 could comprise a UV light sensitive adhesive backed paper that may be secured (e.g., on a temporary basis) to the wall W.

It will be appreciated that while the display 252 has been described as employing electromagnetic radiation to form a mark on the display member 268, electronic signals may be employed instead. For example, the display member 268x could comprise a light array 900 formed of a plurality of LED's and individual or groups of the LED's could be selectively illuminated based on an electronic signal generated or transmitted by the marking unit 266x as shown in FIGS. 25 and 26.

With renewed reference to FIGS. 1 and 2, the tool assembly 10 may be employed as a level, for example to generate or transfer a line onto the wall W that corresponds to a predetermined orientation of the tool 14 (e.g., level, plumb). The tool assembly 10 may be abutted against the wall W such that the seal member 42 of each suction cup 20 is engaged to the wall W and the plunger 34 of one or both of the suction cups 20 can be depressed to purge air out of one or both of the cup members 40 to cause one or both of the cup structures 30 to adhere (via differential air pressure) to the wall W. In situations where only one of the cup structures 30 is adhered to the wall W, the user may apply a force to the tool 14 to rotate the tool 14 about the cup structure 30 (i.e., the housing 32, which is mounted to the frame 200, is rotatable relative to the cup structure 30). Configuration in this manner provides the user with the ability to more easily and accurately orient the tool 14 into the desired position.

The suction cups 20 can be configured to create a relatively strong seal that is effective to secure the tool assembly 10 to even relatively rough surfaces. For the purposes of this disclosure and the appended claims, a "rough surface" is defined as being a sheet of ½" thick commercially available sheet rock (i.e., paper-covered gypsum board also known as gypsum board and drywall) that has been painted via a medium nap paint roller with a coat of conventional and commercially-available drywall primer and a coat of conventional and commercially available flat-finish latex-base paint.

The suction cups 20 can be configured to secure the tool assembly 10 to the rough surface (e.g., the wall W) such that a force or weight that is less than or equal to a first magnitude may be exerted onto the rough surface-secured tool assembly 10 without the causing the cup structures 30 to disengage from or move relative to the rough surface. The first magnitude can be 0.2 kg to 0.8 kg when the cup members 40 are purged of air to a maximum practical extent. If desired, the suction cups 20 can also be configured to secure the tool assembly 10 to the rough surface such that a force or weight that is greater than the first magnitude but less than or equal to a second magnitude will cause the tool assembly 10 to translate relative to the rough surface without causing the suction cups 20 to disengaged (i.e., become completely unsealed from) the rough surface. For example, the second magnitude can be 0.5 kg to 2.5 kg. In some embodiments for example, the rough surface can a vertical wall and the tool assembly 10 is secured to the vertical wall at a height of 1 meter from the ground, the application and maintenance of a vertically downwardly directed force of the second magnitude to the tool assembly 10 can cause the tool assembly 10 to move downward on the vertical wall such that the tool assembly 10 will eventually contact the ground but will also remain adhered to the vertical wall via the suction cups 20. It will be appreciated, however, that other embodiments of a tool assembly constructed in accordance with the teachings of the present disclosure can be configured to different parameters and may or may not have similar functionality to that which has been described.

With reference to FIGS. 1, 4 and 14, one or both of the bases 12 may be removed from the tool 14 and used as discussed above to temporarily mount an article A (e.g., a framed picture) to the wall W. The cup mount 64 may be withdrawn from the mating cup mount 220, and the first hook 90 can be moved into the ring of the indicating structure 98 as shown in FIG. 15. The first and second hooks 90 and 94 can be hooked onto the wire element WE as shown in FIGS. 4 and 5.

With reference to FIGS. 2 through 5, the user may lift the article A with the suction cup 20 and may position the article A on the wall W at the desired mounting position DP. The user may operate the plunger 34 to purge air from the cup structure 30 to permit the seal member 42 to sealingly engage the wall W. It will be appreciated that once the base 12 has been secured to the wall W by the suction cup 20, the user may lift the article A off of the first and second hooks 90 and 94. The user may employ the indicating structure 98 to determine the position IP at which the hanger 600 (FIG. 16) is to be mounted to the wall W. In the example provided, the user can mark (e.g., with a pencil) a mark at the center of the indicating structure 98 to indicate the position of the hook 602 (FIG. 16) of the hanger 600 (FIG. 16). The base 12 may be removed from the wall W, the hanger 600 (FIG. 16) can be located at the position IP and secured to the wall W (at that position). The user may thereafter hang the article by the wire element WE on the hook 602 (FIG. 16) of the hanger 600 (FIG. 16) to mount the article A on the wall at the desired mounting position.

It will be appreciated that in the alternative, the base 12 may be mounted to the wall W prior to the coupling of the first and second hooks 90 and 94 to the wire element WE.

Figure 17:
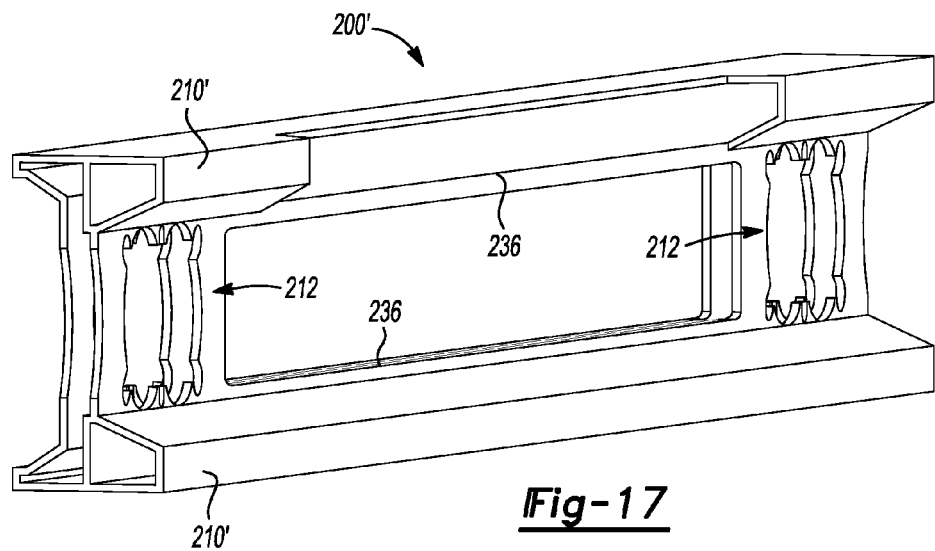
FIG. 17 is a perspective view of a portion of another tool assembly constructed in accordance with the teachings of the present disclosure, the view illustrating the frame of a tool.
Figure 18:
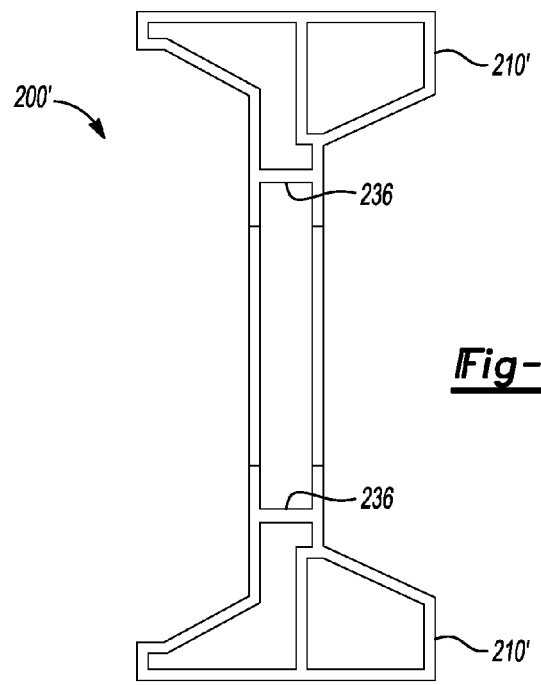
FIG. 18 is a left side elevation view of the frame of FIG. 17.

While the frame 200 has been illustrated and described as comprising a pair of mount structures 212 that are formed of a solid material, it will be appreciated that the frame could be constructed somewhat differently. For example, the frame 200' could be formed as shown in FIGS. 17 through 19. As shown, the frame 200' comprises a pair of hollow (i.e., nonsolid) mount structures 212' that are located on opposite lateral ends of the frame 200'. It will be appreciated that the frame 200' could be formed via extrusion, and that the portion of the extrusion that is disposed between the rails 210' and between the mount structures 212' could be removed in its entirety. If desired, one or more structures, such as the level housing 242', could be employed to close the opening on one or both lateral sides of each mount structure 212' to inhibit the ingress of material into mount structure 212'. Additionally or alternatively, the central rib 236 of each rail 210' could be hollow rather than solid.

With reference to FIGS. 19 through 22, it will also be appreciated that the housings 32' of the suction cups 20' could be configured somewhat differently from that which was shown in FIG. 1. For example, each housing 32' can extend relatively further in a lateral direction to better protect the cup member 40 should the tool assembly 10' be dropped on end. Those of skill in the art will appreciate that in the former example the cup member 40 would not provide protection from impact due to it's extremely flexible nature and as such, the force of the impact would be substantially borne by the portion of the housing 32 (FIG. 1) that shrouds the cup member 40. In this example, impact absorbing structures 700 can be integrated into the remainder of the housing 32' and can be configured to resiliently deflect (in the manner of a spring) in response to receipt of impact energy, as well as to direct the impact energy into the housing 32' at desired locations.

Additionally or alternatively, the cup mount can be configured somewhat differently from that which was described above. For example, the cup mount could include a single arm or tab (not shown) that can be received into a lateral end of a corresponding one of the hollow mount structures 212', or could define an aperture (not shown) into which a portion of the frame can be received. Moreover, various other means aside from or in addition to a friction fit between the cup mount and the frame may be employed. For example, the cup mount 64' can comprise one or more engagement elements 710 that can releasably engage one or more mating engagement elements 712 coupled to the frame 200'. In the example illustrated, the engagement element 710 comprises a generally U-shaped rigid wireform 720, while the mating engagement element 712 comprises a pair of wedge-shaped retaining tabs 722 that are mounted to the level housing 242'. The retaining tabs 722 can have a wedge-shaped directing surface 730 and an abutting surface 732. The wedge-shaped directing surface 730 can be configured to raise the wireform 720 over the retaining tab 722 as the housing 32' is slidably coupled to the frame 200', while the abutting surface 732 is configured to abut the wireform 720 to resist sliding removal of the housing 32' from the frame 200'. If desired, a recess 740 in the level housing 242' and/or a recess 742 in the wireform 720 can be provided to provide space for a user's finger (not shown) to permit the user to more easily pry the wireform 720 upward above the retaining tabs 722 to permit the user to remove the housing 32' from the frame 200'. It will be appreciated, however, that various other devices may be employed to removably couple the housing 32' to the frame 200', including without limitation clips, detents, fasteners, and clasps.

Figure 23:
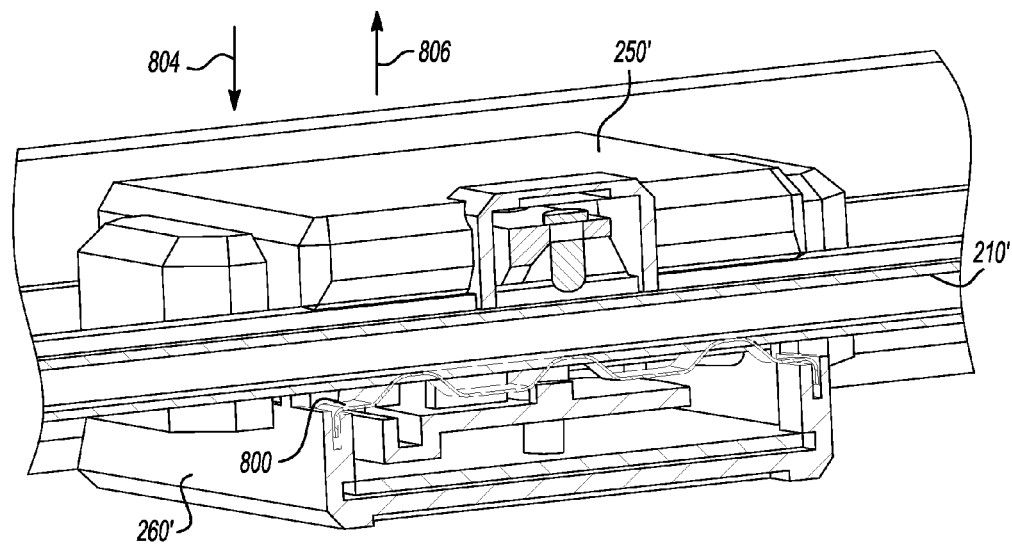
FIG. 23 is a perspective, partially sectioned view of another tool assembly constructed in accordance with the teachings of the present disclosure.
Figure 24:
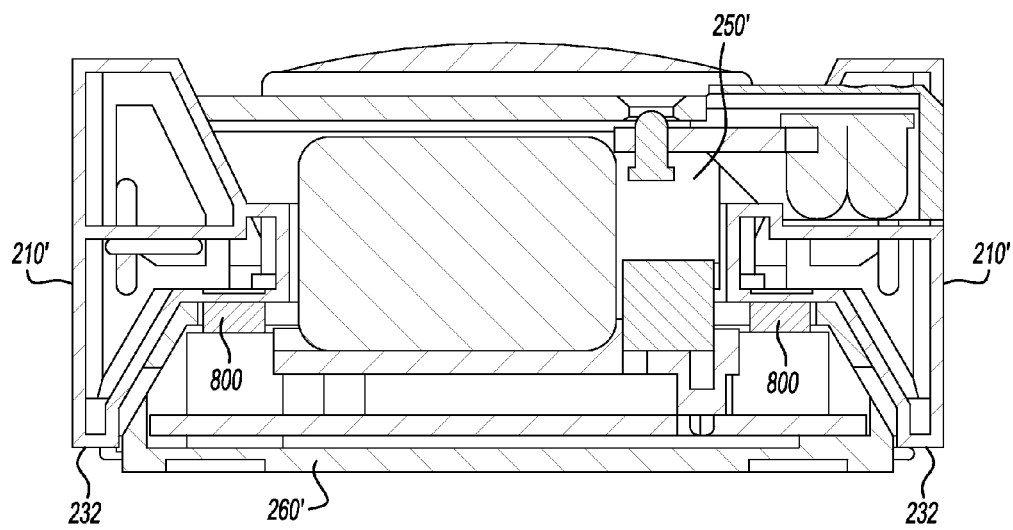
FIG. 24 is a section view taken through a portion of the tool assembly of FIG. 23.

With reference to FIGS. 22 and 23, the detector unit 250' can be configured to provide compliance in a direction that is orthogonal to the rails 210' and to a plane defined by the abutting surfaces 232 of the rails 210'. In the particular example provided, the detector unit 250' is generally similar to the detector unit 250 (FIG. 1) described above, except that a pair of springs, such as leaf springs 800, are disposed between the unit housing 260' and the central rib 236 on the rails 210'. The leaf spring 800 are configured to bias the unit housing 260' in a first direction 804 (i.e., perpendicularly toward the plane defined by the abutting surfaces 232) but permit the unit housing 260' to travel in a second direction 806 that is opposite the first direction (i.e., perpendicularly away from the plane defined by the abutting surfaces 232) to permit the unit housing 260' to traverse over uneven (raised non-flat) portions of a surface to which the abutting surfaces 232 are abutted against.

It will be appreciated that the above description is merely exemplary in nature and is not intended to limit the present disclosure, its application or uses. While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, the mixing and matching of features, elements and/or functions between various examples is expressly contemplated herein, even if not specifically shown or described, so that one of ordinary skill in the art would appreciate from this disclosure that features, elements and/or functions of one example may be incorporated into another example as appropriate, unless described otherwise, above. Moreover, many modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims.

What is claimed is:

1. A tool assembly comprising:
   a tool having a frame; and
   a pair of suction cups, each suction cup comprising a cup housing, and a cup structure, the cup housing being non-rotatably coupled to the frame, the cup structure being at least partly received in the cup housing, wherein at least one of the cup structures is rotatable in the cup housing.

2. The tool assembly of claim 1, wherein a level sensor unit is coupled to the frame.

3. A tool assembly comprising:
   a tool having a frame; and
   a pair of suction cups, each suction cup comprising a cup housing, and a cup structure, the cup housing being coupled to the frame, the cup structure being at least partly received in the cup housing, wherein each cup structure comprises a cup member and a seal member that is mounted on the cup member, the seal member being formed of a resilient material that is different from the material from which the cup member is formed.

4. The tool assembly of claim 3, wherein the material that forms the seal member has a durometer that is less than or equal to 15 Shore A.

5. The tool assembly of claim 4, wherein the material that forms the seal member has a durometer that is less than or equal to 10 Shore A.

6. The tool assembly of claim 3, wherein the seal member is overmolded onto the cup member so as to be cohesively bonded to the cup member.

7. A tool assembly comprising:
   a tool having a frame; and
   a pair of suction cups, each suction cup comprising a cup housing, and a cup structure, the cup housing being coupled to the frame, the cup structure being at least partly received in the cup housing, wherein the cup structures are configured to releasably secure the tool assembly to a rough surface via an air pressure differential.

8. The tool assembly of claim 7, wherein the cup structures are configured to non-movably secure the tool assembly to the rough surface when a force of a first magnitude is applied to the tool assembly.

9. The tool assembly of claim 8, wherein the first magnitude is greater than or equal to 0.2 kg and less than or equal to 0.8 kg.

10. The tool assembly of claim 8, wherein the cup structures are configured to movably secure the tool assembly to the rough surface when a force of a second magnitude is applied to the tool assembly, the second magnitude being greater than the first magnitude.

11. The tool assembly of claim 10, wherein the second magnitude is greater than or equal to 0.5 kg and less than or equal to 2.5 kg.

12. A method for releasably securing a tool assembly to a wall, the tool assembly comprising a level sensor and a first suction cup, the method comprising:
abutting the tool assembly to the wall;
purging air from the first suction cup to create a pressure differential that secures the first suction cup to the wall; and
rotating the level sensor about the first suction cup after the first suction cup has been secured to the wall.

13. The method of claim 12, wherein the tool assembly has a second suction cup and the method further comprises purging air from the second suction cup to create a pressure differential that secures the second suction cup to the wall.

14. The method of claim 13, further comprising moving the tool assembly on the wall after the first and second suction cups have been secured to the wall.

15. A tool assembly comprising:
a pair of suction cups, each suction cup comprising a cup housing, and a cup member, the cup housing including a cup mount, the cup member being at least partly received in the cup housing and rotatable relative to the cup housing;
a tool with a mating cup mount that removably receives the cup mount to thereby couple the suction cup to the tool;
wherein the cup mount and the mating cup mount frictionally engage one another to retain the cup mount and the mating cup mount together.

16. The tool assembly of claim 15, wherein the tool defines first and second spaced apart hollow channels and wherein the cup mount comprises a pair of spaced apart arms that are received into the first and second hollow channels.

17. The tool assembly of claim 15, wherein each suction cup further comprises an engagement element that is releasably coupled to an associated mating engagement element that is coupled to the tool.

18. The tool assembly of claim 17, wherein one of the engagement element and the mating engagement element comprises a generally U-shaped wireform and the other one of the engagement element and the mating engagement element comprises a retaining tab that is configured to releasably engage the wireform.

19. A tool assembly comprising:
a tool having a frame; and
a pair of suction cups, each suction cup comprising a cup housing, and a cup structure, the cup housing being coupled to the frame, the cup structure being at least partly received in the cup housing and being configured to be deformed along an axis to purge air from an interior of the cup structure to permit the suction cup to be secured to a surface, the axis being orthogonal to the surface, wherein at least one of the cup structures is rotatable about the axis relative to the frame.

* * * * *